UNITED STATES PATENT OFFICE.

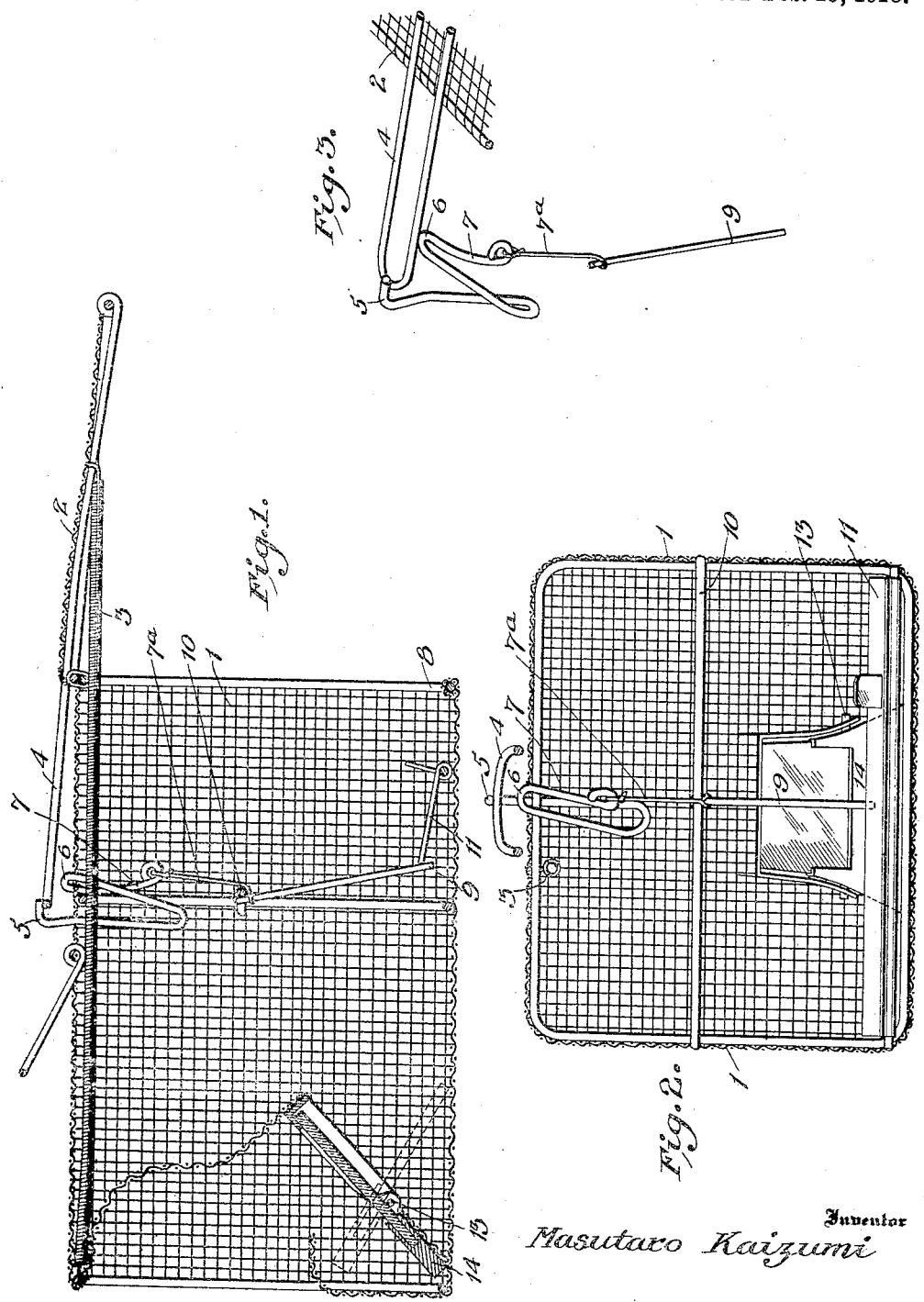

MASUTARO KAIZUMI, OF SEATTLE, WASHINGTON.

RAT-TRAP.

1,257,244.

Specification of Letters Patent.

Patented Feb. 19, 1918.

Application filed May 23, 1917. Serial No. 170,505.

*To all whom it may concern:*

Be it known that I, MASUTARO KAIZUMI, a subject of the Emperor of Japan, residing at Seattle, Washington, (152 9th avenue,) in the county of King and State of Washington, have invented certain new and useful Improvements in Rat-Traps; and I do hereby declare the following to be a full, clear, and exact description of the invention, such as will enable others skilled in the art to which it appertains to make and use the same.

This invention relates to animal traps, and particularly to traps comprising a cage with one end or portion of the walls arranged on a hinge to open, and connected to a spring operative to quickly close such opened portion or door, when a rat steps inside the door, and relates also to traps with a large door to close when a rat has stepped inside, and a smaller door through which other rats can enter after the first door has closed; the smaller door so arranged on a balancing pivot so that it will open inward, but not outward and permit any number of rats to separately enter the trap, but permit none to escape.

It is well known that rats are cunning, and it is difficult to trap them because of their wariness. They fear to enter a closed cage when there are no rats within, but when the cage contains a live and uninjured rat, others will frequently try to reach the one imprisoned.

The invention consists of the construction, the combination, and in details and arrangement of parts as more fully hereinafter described and shown by the embodiment illustrated in the drawing wherein:

Figure 1 is a central vertical longitudinal section.

Fig. 2 is a transverse section.

Fig. 3 is a detail perspective view of the trigger.

Like numbers refer to like parts.

The outside walls 1 are preferably made of wire netting, having the front end 2 mounted on a hinge joint at the top wall to permit it to swing open from the bottom and leave the entire end of the trap open. A spring 3 tends to hold the door closed. An extension 4 on the swinging door swings down near the top of the cage when the door is opened, and a trigger 5 is fastened to the top wall by an elongated loop 6, and as the point of trigger 5 is hooked over the end extension 4 the spring 3 tends to cause the lower end of the trigger shank 7 to pull upward. A flexible cord $7^a$ is fastened to the lower end of shank 7, to which cord is connected a wire rod 9 at a point a short distance below the top of rod 9. A fixed cross bar 10 extends across the cage, and the upper end of rod 9 is placed back of the bar 10, and the tension of the spring 3 active through trigger 5 on the cord causes the lower end of rod 9 to press or tilt forward below bar 10. A flap or wide threshold 11 is hinged near the front bottom of the side walls and extends across the doorway 8. The back edge of the flap normally rests on the floor of the cage, but when the front door is raised and the lower end of rod 9 pressed forward as above described, then the rear edge of the flap 11 is raised to abut and prevents the said lower end of rod 9 from moving farther toward the doorway, and the door is thereby held open by the trigger, until a rat attempting to enter the cage for any suspended bait steps on the threshold flap 11, and presses it down until rod 9 is released, together with the trigger 5 and door 2 is closed by the spring 3, thus holding the rat a prisoner.

At the other end of the trap is a small glass tilting gate fastened on a transverse hinge or pivot 13, a counter weight 14 holds the gate 12 normally closed, but the pressure from the front feet of any rat attempting to enter over the transparent gate throws it open, and this new rat becomes a prisoner with the others within the cage. The door 12 is placed at the end of an entrance passageway into which the rats readily enter when another one is within the cage.

What is claimed as new is:

1. An animal trap having a plurality of gates or doors, a trigger for holding one door fully open, means for closing the door when released by said trigger, a tiltable threshold, and controlling means connected to said trigger and engaging the said threshold.

2. An animal trap having a plurality of doors or gates, a tiltable threshold, a trigger engageable with one of said doors to hold it fully open, means for closing the door, and a fulcrumed lever connected to said trigger and adapted to swing about its fulcrum when the trigger is set to engage the said threshold.

3. An animal trap having an animal-actuated, self-closing gate and a door, means for closing the door, a trigger means for holding the door open comprising a threshold pivoted to swing downward, a trigger having a part to engage a complementary member on the door when the latter is open, a fulcrum, and a lever rod connected at one end to said trigger and adapted to rock about said fulcrum to engage said threshold when the latter is set, the closing means holding the trigger means in set position until released by pressure on the threshold.

In testimony whereof I affix my signature.

MASUTARO KAIZUMI.

Copies of this patent may be obtained for five cents each, by addressing the "Commissioner of Patents, Washington, D. C."